United States Patent
Bahar et al.

(10) Patent No.: US 11,674,009 B2
(45) Date of Patent: Jun. 13, 2023

(54) COMPOSITE ION EXCHANGE MEMBRANE AND METHOD OF MAKING SAME

(71) Applicant: FFI IONIX IP, INC., Wilmington, DE (US)

(72) Inventors: Bamdad Bahar, Georgetown, DE (US); Zhefei Li, Harrington, DE (US)

(73) Assignee: FFI IONIX IP, INC., Wilmington, DE (US)

( * ) Notice: Subject to any disclaimer, the term of this patent is extended or adjusted under 35 U.S.C. 154(b) by 0 days.

(21) Appl. No.: 17/704,814

(22) Filed: Mar. 25, 2022

(65) Prior Publication Data

US 2022/0213283 A1    Jul. 7, 2022

Related U.S. Application Data

(63) Continuation of application No. 15/912,416, filed on Mar. 5, 2018, now Pat. No. 11,286,357.
(Continued)

(51) Int. Cl.
| | |
|---|---|
| C08J 5/22 | (2006.01) |
| B01J 47/016 | (2017.01) |
| B01J 47/12 | (2017.01) |
| B01J 41/14 | (2006.01) |
| B01D 69/12 | (2006.01) |

(52) U.S. Cl.
CPC ............. *C08J 5/2281* (2013.01); *B01J 41/14* (2013.01); *B01J 47/016* (2017.01); *B01J 47/12* (2013.01); *C08J 5/22* (2013.01); *C08J 5/2231* (2013.01); *C08J 5/2262* (2013.01); *C08J 5/2287* (2013.01); *B01D 69/12* (2013.01); *C08J 2323/06* (2013.01); *C08J 2327/18* (2013.01); *C08J 2361/18* (2013.01); *C08J 2365/00* (2013.01)

(58) Field of Classification Search
CPC ...... C08J 5/2281; C08J 5/2287; C08J 5/2231; C08J 5/2262; C08J 5/22; B01J 4/016; B01J 4/12; B01J 4/14; B01J 2223/06; B01J 2327/18; B01J 2365/00; B01J 2361/18; B01D 69/12
USPC ........................................................ 521/27
See application file for complete search history.

(56) References Cited

U.S. PATENT DOCUMENTS

2005/0221134 A1*  10/2005  Liu .................... H01M 8/04119
                                                                429/442

FOREIGN PATENT DOCUMENTS

WO    WO-2016081432 A1 *  5/2016  ............. A01N 29/00

OTHER PUBLICATIONS

Olvera et al. "Novel High Molecular Weight Aromatic Fluorinated Polymers from One-Pot, Metal-Free Step Polymerizations", Macromolecules, 2013, vol. 46, pp. 7245-7256 (Year: 2013).*

(Continued)

*Primary Examiner* — Michael M. Bernshteyn
(74) *Attorney, Agent, or Firm* — Invention To Patent Services; Alex Hobson

(57) ABSTRACT

An anion exchange membrane is made by mixing 2 trifluoroMethyl Ketone [nominal] (1.12 g, 4.53 mmol), 1 BiPhenyl (0.70 g, 4.53 mmol), methylene chloride (3.0 mL), trifluoromethanesulfonic acid (TFSA) (3.0 mL) to produce a pre-polymer. The pre-polymer is then functionalized to produce an anion exchange polymer. The pre-polymer may be functionalized with trimethylamine in solution with water. The pre-polymer may be imbibed into a porous scaffold material, such as expanded polytetrafluoroethylene to produce a composite anion exchange membrane.

15 Claims, 1 Drawing Sheet

Related U.S. Application Data

(60) Provisional application No. 62/466,644, filed on Mar. 3, 2017.

(56) References Cited

OTHER PUBLICATIONS

Lee et al. "Robust Hydroxide Ion Conducting Poly(biphenyl alkylene)s for Alkaline Fuel Cell Membranes", ACS Macro Letters, 2015, vol. 4, pp. 814-817 (Year: 2015).*

* cited by examiner

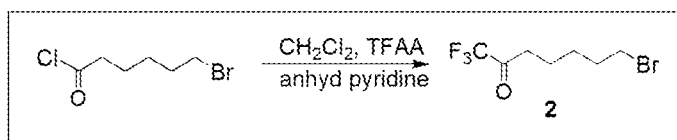 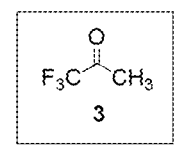
FIG. 1  FIG. 2
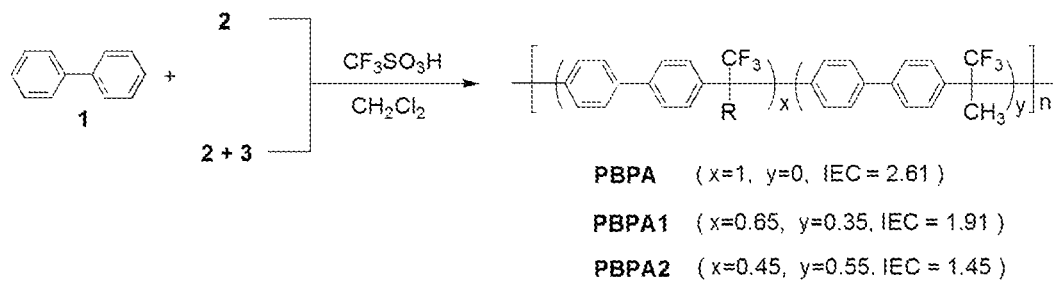
FIG. 3
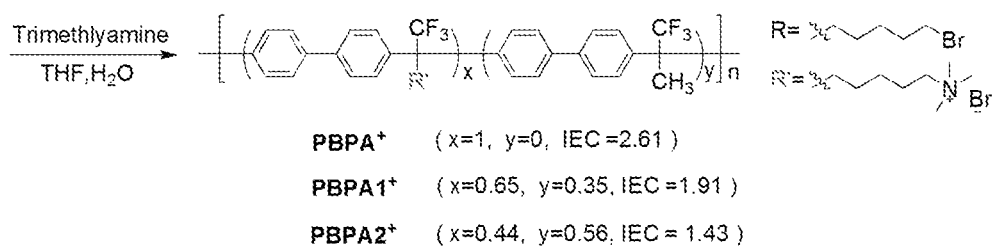
FIG. 4

COMPOSITE ION EXCHANGE MEMBRANE AND METHOD OF MAKING SAME

CROSS REFERENCE TO RELATED APPLICATIONS

This application is a continuation of U.S. patent application Ser. No. 15/912,416, filed on Mar. 5, 2018 and currently pending, which claims the benefit of priority to U.S. provisional patent application No. 62/466,644 filed on Mar. 3, 2017; the entirety of which both prior applications are hereby incorporated by reference herein.

BACKGROUND OF THE INVENTION

Field of the Invention

The invention is directed to unique ion exchange polymer and membranes and more particularly to composite anion exchange membranes.

Background

Alkaline exchange membranes or anion exchange membranes (AEMs) allow for the transportation of anions (e.g., OH", cl", Br") from the cathode to the anode in an electrochemical reaction. AEMs are a critical component of AEM fuel cells, where hydrogen and oxygen are used to generate electricity, with water as a byproduct. AEMs are also used in water electrolysis, where water is split into hydrogen and oxygen using electricity. In both AEM fuel cells and water electrolysis, hydroxide ions (OH) are transported through the AEM, along with water molecules. AEMs may also be used, for example, in batteries, sensors, electrochemical compressors, and as actuators.

Known AEMs are generally unsuitable for use in AEM fuel cells or water electrolysis. Many commercially-available AEMs are based on polystyrene, which is generally considered a poor choice for AEM fuel cells or water electrolysis. Other AEM materials contain an arylene ether linkage (-0-) in the mid-chain and a benzyltrimethyl ammonium group in the side-chain. This combination, however, has been found to be chemically unstable and to degrade easily under highly alkaline conditions.

Advanced alkaline membranes are also designed to have high ion exchange capacity, which in turn means that they will have a tendency to swell with absorption of water or a polar species. This swelling results in loss of strength and renders them less suitable mechanically for service. In addition, this loss of mechanical properties implies a need for thick membranes that in turn provides for higher ionic resistance.

There is therefore a need for a chemically stable Anion exchange membrane with high ion exchange capacity, but also good mechanical properties that can be produced in thin films with low ionic resistance.

SUMMARY OF THE INVENTION

The invention is directed to ion exchange polymers and ion exchange membranes and particularly to composite anion exchange membranes. The invention relates to a method of making a composite ion exchange membrane comprising the steps of combining a pre-polymer with a porous scaffold material and subsequently functionalizing the pre-polymer with a functional polymer to produce a composite ion exchange membrane. The pre-polymer is converted, or functionalized, into an ion exchange polymer. The pre-polymer may be prepared by mixing components including but not limited to, 2 trifluoroMethyl Ketone; 1 BiPhenyl; methylene chloride; and trifluoromethanesulfonic acid. The pre-polymer may be mixed for a mixing time at a mixing temperature. An exemplary functional polymer is selected from the group consisting of: hydroxide halide and oxyanions (e.g. perchlorate, aluminate, nitrate, borate, etc). The exchange polymer produced by the functionalizing of the pre-polymer may be cationic or anionic.

The porous scaffold material may be a porous polymeric material such as a porous polyolefin or a porous fluoropolymer. The porous scaffold should be chemically resistant to the chemicals and processing as described herein. Fluoropolymers and some polyolefins, such as polyethylene may be good candidates for this purpose. An exemplary porous scaffold is expanded ultra-high molecular weight polyethylene and expanded polytetrafluoroethylene. Expanded polytetrafluoroethylene is inherently hydrophobic and therefore may need to be treated to enable the pre-polymer to wet the surface and at least partially fill the pores of open area of the expanded polytetrafluoroethylene. The surface of the expanded polytetrafluoroethylene may be modified by use of UV, a surfactant or the addition of an ion exchange medium.

The composite ion exchange membrane made by combining the polymer with the porous scaffold may be relatively thin, such as no more than about 50 µm no more than about 25 µm, no more than about 15 µm, no more than about 10 µm, no more than about 5 µm and any range between and including the thickness values listed. A thinner ion exchange membrane is preferred for lower ionic resistance and higher conductance values.

The summary of the invention is provided as a general introduction to some of the embodiments of the invention and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description explain the principles of the invention.

FIG. 1 shows an exemplary polymer reaction of the present invention wherein a pre-polymer is functionalized into an ion exchange polymer.

FIG. 2 shows an exemplary ion exchange polymer of the present invention.

FIG. 3 shows an exemplary polymer reaction of the present invention wherein a pre-polymer is functionalized into an ion exchange polymer.

FIG. 4 shows an exemplary polymer reaction to functionalize a polymer of the present invention.

DETAILED DESCRIPTION OF THE ILLUSTRATED EMBODIMENTS

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Referring now to FIG. 1, in one embodiment, the invention provides an ionomer (7-Bromo-1,1,1-trifluoroheptan-2one (2)) was prepared according to literature or purchased commercially (ref: 647831-24-1 Molbase). Accordingly, a mixture of 2 trifluoroMethyl Ketone [nominal] (1.12 g, 4.53 mmol), 1 BiPhenyl (0.70 g, 4.53 mmol), methylene chloride (3.0 mL), trifluoromethanesulfonic acid (TFSA) (3.0 mL), and a magnetic stirring bar was stirred at room temperature under nitrogen. After ten hours, the reaction mixture solution became highly viscous and was stirred for additional two hours. The resulting dark-brown, gel-like mass was then shredded with sonication and poured slowly into methanol. White fiber formed was filtered and washed with hot methanol. After drying under vacuum, 1.70 g of white fiber-like solid was obtained (97% yield). Or alternatively, a polymer according to the same general formula where in each of R1 and R2 is, independently, a linear alkyl chain or a cyclic alkyl chain, and Z is selected from a group consisting of: a linear alkyl chain, a cyclic alkyl chain, and an alkylene ether chain.

The polymer may then be dissolved in methanol, or one of generally well known organic solvents such as DMSO. As an example, the polymer may be dissolved in a 5% weight ratio i.e. 1 gram of polymer, 19 grams of methanol.

The mixture was then poured onto a 12 micron thick (Ref MBU200.012) expanded PTFE membrane supplied by TTG Inc. The mixture was then spread using a draw bar, and dried using a hot air dryer.

This process was repeated. The resulting membrane was 15 microns thick. The membrane was tear resistant, and folded comfortably without breakage. It was therefore mechanically suitable for use, and thin. Those skilled in the art, can appreciate that this process can be performed on a roll to roll, composite production system, with rollers, and draw bars in place; with hot air or other types of ovens in a generally continuous process.

The membrane was then functionalized by dipping the membrane in trimethylamine in solution with water to provide ion exchange capacity with quaternized ammonium hydroxide.

Embodiments of the invention involve composites including a new class of quaternized ammonium hydroxide-containing polymers prepared from a styrene-butadiene block copolymer (SEBS). This new class of polymers may be used in alkaline exchange membranes (AEMs), lack an arylene ether linkage in the polymer main-chain, and can be prepared with any of a number of quaternized ammonium groups in the polymer side-chains.

An SEBS, compound I, is employed where x and y are mol % of each repeating unit and 2x+y=100. For example, in some embodiments of the invention, x is 15 and y is 70. Other values are possible, of course, as will be recognized by one skilled in the art. An iridium-catalyzed borylation is then performed using bis(pinacolato)diboron (B2Pin2) to introduce a boronic ester group into the aromatic rings of the SEBS, yielding compound II.

As an alternate to expanded polytetrafluoroethylene porous scaffold, other scaffolds may be also be used, which have surface interactions with the ionomers. An ideal scaffold would have high permeability and provide excellent support (i.e. have great mechanical properties). The scaffold would ideally have a a high-precision thin-film uniform-pore or permeability membrane. Many materials made of polyolefins meet this requirement. Most particularly those made of polypropylene or polyethylene. One scaffold used, was made of ultra-high molecular weight polyethylene, available in a range of pore diameters from 20 nm to 3 μm. Porosity of between 40% and 90%. And, membrane thicknesses from 4 μm to 200 μm.

Polymers according to embodiments of the invention may be employed in any number of contexts, including, for example, as fuel cell alkaline exchange membranes, fuel cell ionomers, electrolysis alkaline exchange membranes, as actuators, and in any number of battery applications, as will be apparent to one skilled in the art.

One skilled in the art will also recognize, of course, that various changes, additions, or modifications of or to the methods described above may be made without substantively altering the compounds obtained or their characteristics. Such changes, additions, and modifications are therefore intended to be within the scope of the invention.

This written description uses examples to disclose the invention, including the best mode, and to enable any person skilled in the art to practice the invention, including making and using any devices or systems and performing any related or incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A composite ion exchange membrane comprising:
   a) a porous scaffold material having pores and selected from the group of porous polyolefin and porous fluoropolymer;

b) a pre-polymer comprising:
  i) 2 trifluoromethyl ketone;
  ii) 1 biphenyl;
  iii) methylene chloride; and
  iv) trifluoromethanesulfonic acid,
  wherein the prepolymer is configured in the pores of said porous scaffold material;
c) a functional polymer bonded with the prepolymer, said functional polymer selected from the group consisting of hydroxide halide and oxyanions; and
d) trimethylamine; and
  wherein said functional polymer is functionalized with said trimethylamine to produce said composite ion exchange membrane having quaternized ammonium hydroxide functional groups.

2. The composite ion exchange membrane of claim 1, wherein the porous scaffold is a hydrophilic porous scaffold.

3. The composite ion exchange membrane of claim 1, wherein the porous scaffold material consists of porous polyolefin.

4. The composite ion exchange membrane of claim 3, wherein the porous polyolefin comprises polyethylene.

5. The composite ion exchange membrane of claim 1, wherein the porous scaffold material comprises porous polyethylene film.

6. The composite ion exchange membrane of claim 1, wherein the porous scaffold material comprises expanded ultra-high molecular weight polyethylene.

7. The composite ion exchange membrane of claim 1, wherein the porous scaffold material-comprises expanded polytetrafluoroethylene.

8. The method of making an ion exchange membrane of claim 7, wherein the porous scaffold material further comprises a surface modifier to produce a hydrophilic expanded polytetrafluoroethylene membrane.

9. The composite ion exchange membrane of claim 8, wherein the surface modifier comprises a surfactant.

10. The composite ion exchange membrane of claim 8, wherein the surface modifier comprises an ion exchange medium.

11. The composite ion exchange membrane of claim 1, wherein the ion exchange polymer is cationic.

12. The composite ion exchange membrane of claim 1, wherein the ion exchange polymer is anionic.

13. The composite ion exchange membrane of claim 1, where in the ion exchange membrane is less than 50 microns.

14. The composite ion exchange membrane of claim 1, where in the ion exchange membrane is less than 25 microns.

15. The composite ion exchange membrane of claim 1, where in the ion exchange membrane is less than 15 microns.

* * * * *